United States Patent [19]
Hunt et al.

[11] Patent Number: 5,013,612
[45] Date of Patent: May 7, 1991

[54] BRAZE MATERIAL FOR JOINING CERAMIC TO METAL AND CERAMIC TO CERAMIC SURFACES AND JOINED CERAMIC TO METAL AND CERAMIC TO CERAMIC ARTICLE

[75] Inventors: Thomas K. Hunt, Ann Arbor; Robert F. Novak, Farmington Hills, both of Mich.

[73] Assignee: Ford Motor Company, Dearborn, Mich.

[21] Appl. No.: 434,380

[22] Filed: Nov. 13, 1989

[51] Int. Cl.$^5$ .................................................. B22F 7/04
[52] U.S. Cl. .................................... 428/552; 428/568; 428/569; 428/622; 428/632; 428/680; 428/469; 429/193
[58] Field of Search ........................ 420/441, 457, 457; 438/545, 552, 553, 568, 569, 622, 632, 680, 469, 702; 429/11, 193

[56] References Cited

U.S. PATENT DOCUMENTS

| | | | |
|---|---|---|---|
| 4,175,164 | 11/1979 | Cole | 429/11 |
| 4,289,833 | 9/1981 | Hachisuka | 428/545 |
| 4,505,991 | 3/1985 | Weber | 429/11 |
| 4,604,325 | 8/1986 | Mizuhara | 420/587 |
| 4,606,978 | 8/1986 | Mizuhara | 420/587 |

Primary Examiner—R. Dean
Assistant Examiner—George Wyszomierski
Attorney, Agent, or Firm—Randolph A. Smith; Roger L. May

[57] ABSTRACT

An improved active metal braze filler material is provided in which the coefficient of thermal expansion of the braze filler is more closely matched with that of the ceramic and metal, or two ceramics, to provide ceramic to metal, or ceramic to ceramic, sealed joints and articles which can withstand both high temperatures and repeated thermal cycling without failing. The braze filler material comprises a mixture of a material, preferably in the form of a powder, selected from the group consisting of molybdenum, tungsten, silicon carbide and mixtures thereof, and an active metal filler material selected from the group consisting of alloys or mixtures of nickel and titanium, alloys or mixtures of nickel and zirconium, alloys or mixtures of nickel, titanium, and copper, alloys or mixtures of nickel, titanium, and zirconium, alloys or mixtures of niobium and nickel, alloys or mixtures of niobium and zirconium, alloys or mixtures of niobium and titanium, alloys or mixtures of niobium, titanium, and nickel, alloys or mixtures of niobium, zirconium, and nickel, and alloys or mixtures of niobium, titanium, zirconium, and nickel. The powder component is selected such that its coefficient of thermal expansion will effect the overall coefficient of thermal expansion of the braze material so that it more closely matches the coefficients of thermal expansion of the ceramic and metal parts to be joined.

19 Claims, 1 Drawing Sheet

BRAZE MATERIAL FOR JOINING CERAMIC TO METAL AND CERAMIC TO CERAMIC SURFACES AND JOINED CERAMIC TO METAL AND CERAMIC TO CERAMIC ARTICLE

BACKGROUND OF THE INVENTION

This invention was made under contract with or subcontract thereunder of the Department of Energy Contract No. DE-AC02-83CE40651.

This invention relates to an active metal braze material for joining ceramic and metal, or two ceramic, surfaces together, and more particularly to such a braze material having a coefficient of expansion which is matched with the particular metal and ceramic materials to be joined. The invention also relates to the ceramic to metal, or ceramic to ceramic joined article produced thereby.

While sealing glasses and certain metal braze filler materials are useful in joining ceramic and metal parts together for low temperature applications, when high temperatures are encountered, active metal brazing materials need to be used for joining the ceramic and metal parts together. Typically, the braze joints which are formed must be able to withstand high temperatures and repeated thermal cycling. Such active metal braze materials are distinguished by containing an element having a high oxygen affinity for wetting the surface of the ceramic. Such brazing materials typically contain metals such as titanium, copper, silver, nickel, niobium, zirconium, and/or beryllium.

One application for the use of active metal brazing materials has been in the assembly of thermoelectric generators, commonly known as sodium heat engines. Thermoelectric generators are known, and their construction and principles of operation have been described, for example, in U.S. Pat. Nos. 4,094,877, 4,098,958, and 4,510,210, among others. Such thermoelectric generators electrochemically expand an alkali metal across a solid electrolyte. Sodium is typically the alkali metal of choice in such devices, although other alkali metals may be employed.

A typical sodium heat engine comprises a closed container separated into first and second reaction zones by a solid electrolyte. Liquid sodium metal is present in the first reaction zone on one side of the solid electrolyte and is maintained, during operation of the engine, at a pressure higher than that of the second reaction zone. In the lower pressure second reaction zone, a permeable, electrically conductive electrode is in contact with the solid electrolyte. During operation of the engine, a heat source raises the temperature of the sodium in the first reaction zone to above its melting point, typically in the range of from about 600° to 1000° C. The high temperature liquid sodium metal also has a corresponding high vapor pressure which creates a sodium vapor pressure differential across the solid electrolyte. In response to this pressure differential, the liquid elemental sodium gives up electrons to an electrode in contact with the sodium metal. The resulting sodium ions then migrate through the solid electrolyte.

The electrons, having passed through an external load, then neutralize sodium cations at the permeable electrode/solid electrolyte interface. Elemental sodium metal evaporates from the permeable electrode and migrates through the lower pressure second reaction zone (preferably, a near vacuum space) to a lower temperature condenser. The condensed liquid sodium may then be collected and returned back to the higher temperature first reaction zone to complete the closed cycle. This may be accomplished, for example, by means of a return line and electromagnetic pump.

All of the materials used in the construction of such sodium heat engines must be able to withstand the typical operating temperatures encountered which are in the range of from about 600° to 1000° C. Further, many of the materials which come into contact with liquid or gaseous sodium must be able to withstand the corrosive qualities of such alkali metals. Additionally, because the first and second reaction zones are maintained at different temperatures and pressures during operation of the sodium heat engine, liquid and vapor tight seals must be maintained in the engine.

Typically, such sodium heat engines utilize a ceramic such as an alkali metal beta alumina as the solid electrolyte material because of its ability to withstand the high temperatures and corrosive materials encountered during operation. Metal parts typically utilize refractory metals such as tantalum, niobium, and molybdenum and alloys containing such metals which can withstand the operating environment found in such devices. Assembly of sodium heat engine systems typically requires the attachment of beta alumina solid electrolyte bodies to metal system members. Accordingly, attachment means must also be able to withstand the high temperatures and corrosive environment of the system.

Under such severe conditions, commonly used glass sealing materials do not provide adequate corrosion resistance. Common brazing materials such as molybdenum-manganese, which employ oxide coatings on the ceramic electrolyte member, are not suitable because of the reduction of the oxide coatings by the high temperature liquid sodium. For these reasons, brazing filler materials used in sodium heat engines need to contain an active metal component such as titanium or zirconium to provide good adhesion to the ceramic electrolyte material.

However, even where active metal brazes have been used in the past, problems have arisen in the integrity of seals formed by joining the metal and ceramic parts together. Frequently, such seals have failed due to thermal stress-induced fractures of the ceramic electrolyte material. Hermetically sealed joints have not been practical heretofore because the thermal coefficient of expansion of the active metal brazes is badly mismatched with the ceramic and/or metal materials. The ceramic to metal joints typically must withstand repeated thermal cycling over the range of temperatures from about 20° to 1000° C.

Accordingly, there still exists a need in the art for a braze material for joining metal and ceramic surfaces together and which can withstand thermal cycling and corrosive environments while maintaining a good seal.

SUMMARY OF THE INVENTION

The present invention meets that need by providing an improved active metal braze filler material in which the coefficient of thermal expansion of the braze filler is more closely matched with that of the ceramic and metal, or two ceramics, to provide ceramic to metal, or ceramic to ceramic, sealed joints and articles which can withstand both high temperatures and repeated thermal cycling without failing. The term "ceramic", as it is used herein, is intended to include both crystalline, semicrystalline, and amorphous (i.e., high temperature glasses) materials which are capable of surviving the 900° C. or greater brazing temperatures used in the practice of the present invention.

In accordance with one aspect of the present invention, a brazing filler material for joining ceramic and metal surfaces is provided which comprises a mixture of a material, preferably in powder form, selected from the group consisting of molybdenum, tungsten, silicon carbide and mixtures thereof, and an active metal filler material selected from the group consisting of alloys or mixtures of nickel and titanium, alloys or mixtures of nickel and zirconium, alloys or mixtures of nickel, titanium, and copper, and alloys of nickel, titanium, and zirconium. Additionally, the active metal filler material can be selected from the group consisting of alloys or mixtures of niobium and nickel, alloys or mixtures of niobium and zirconium, alloys or mixtures of niobium and titanium, alloys or mixtures of niobium, titanium, and nickel, alloys or mixtures of niobium, zirconium, and nickel, and alloys or mixtures of niobium, titanium, zirconium, and nickel. The active metal filler may be either an alloy or a physical mixture. Using an unalloyed mixture initially may provide advantages in that the mixture may melt at a lower temperature for given metals. A true metal alloy may form only after the mixture has been melted.

The powder component of the braze material preferably remains largely undissolved in the active metal component of the braze material during the brazing operation. The powder component is selected such that its coefficient of thermal expansion will affect the overall coefficient of thermal expansion of the braze material so that it more closely matches the coefficients of thermal expansion of the ceramic and metal parts to be joined.

In a preferred embodiment of the invention, the powder is molybdenum and the active metal filler is an alloy or mixture of titanium, copper, and nickel. The present invention is particularly suited for use to form sealed metal to ceramic joints in a thermoelectric generator such as a sodium heat engine where a solid ceramic electrolyte is joined to metal parts in the system. Such a system undergoes repeated thermal cycling at temperatures of between about 20° to about 1000° C. and is subjected to corrosive liquid alkali metals during operation.

Typically, in such a sodium heat engine, the ceramic electrolyte is formed into a hollow cylindrical tube which is closed at one end. The ceramic electrolyte tube is then joined at its open end to a metal portion of the system. The tube is then filled during operation with heated liquid sodium. Thus, the brazing filler material of the present invention finds use for joining beta alumina ceramic and metal surfaces in a thermoelectric generator such as a sodium heat engine. The use of the term beta alumina ceramic is intended to encompass all beta and beta" alumina ceramics involving an alkali metal. Sodium beta alumina ceramics are preferred.

The brazing filler material comprises a mixture of a material which remains largely undissolved in the filler and which material has a coefficient of thermal expansion less than that of beta alumina ceramic, and an active metal filler material selected from the group consisting of alloys or mixtures of nickel and titanium, alloys or mixtures of nickel and zirconium, alloys or mixtures of nickel, titanium, and copper, and alloys or mixtures of nickel, titanium, and zirconium. Additionally, the active metal filler material can be selected from the group consisting of alloys or mixtures of niobium and nickel, alloys or mixtures of niobium and zirconium, alloys or mixtures of niobium and titanium, alloys or mixtures of niobium, titanium, and nickel, alloys or mixtures of niobium, zirconium, and nickel, and alloys or mixtures of niobium, titanium, zirconium, and nickel. The active metal filler material has a coefficient of thermal expansion larger than that of the ceramic.

We have found that where such a material is added to the active metal filler and remains largely undissolved therein, it has an effect on the overall thermal coefficient of expansion for the brazing filler so that it more closely matches the coefficients of thermal expansion for the metal and ceramic surfaces to be joined. In a preferred embodiment of the invention, the material which remains largely undissolved in the filler is molybdenum powder and the active metal filler is an alloy or mixture of titanium, copper, and nickel. The metal to be joined is selected from the group consisting of molybdenum, tantalum, niobium, tungsten, vanadium, and alloys thereof.

The present invention also relates to a metal to ceramic joined article or a ceramic to ceramic joined article. The joined article comprises either a ceramic member and a metal member, or first and second ceramic members, and a brazing filler material for joining the members together, the brazing filler material comprising a mixture of a material, preferably in powder form, selected from the group consisting of molybdenum, tungsten, silicon carbide and mixtures thereof, and an active metal filler material selected from the group consisting of alloys or mixtures of nickel and titanium, alloys or mixtures of nickel and zirconium, alloys or mixtures of nickel, titanium, and copper, and alloys or mixtures of nickel, titanium, and zirconium. Additionally, the active metal filler material can be selected from the group consisting of alloys or mixtures of niobium and nickel, alloys or mixtures of niobium and zirconium, alloys or mixtures of niobium and titanium, alloys or mixtures of niobium, titanium, and nickel, alloys or mixtures of niobium, zirconium, and nickel, and alloys or mixtures of niobium, titanium, zirconium, and nickel.

In a preferred embodiment, the powder is molybdenum and the active metal filler is an alloy or mixture of titanium, copper, and nickel. The joined article may be a portion of a thermoelectric generator in which the ceramic beta alumina electrolyte is joined with a metal which is selected from the group consisting of molybdenum, tantalum, niobium, tungsten, vanadium, and alloys thereof.

Accordingly, it is an object of the present invention to provide an improved active metal braze filler material in which the coefficient of thermal expansion of the braze filler is more closely matched with that of the ceramic and metal to provide ceramic to metal sealed joints and articles which can withstand both high temperatures and repeated thermal cycling without failing. This, and other objects and advantages of the present invention, will become apparent from the following detailed description, the accompanying drawings, and the appended claims.

DETAILED DESCRIPTION OF THE PREFERRED EMBODIMENTS

While it will be understood by those skilled in this art that the improved active metal braze filler material of the present invention may find use in a number of applications where the joining together of ceramic and metal surfaces or two ceramic surfaces is required, the invention will be described with reference to a typical application of the invention to the sealing of a solid ceramic electrolyte to a metal surface in a thermoelectric generator.

Figure 1:
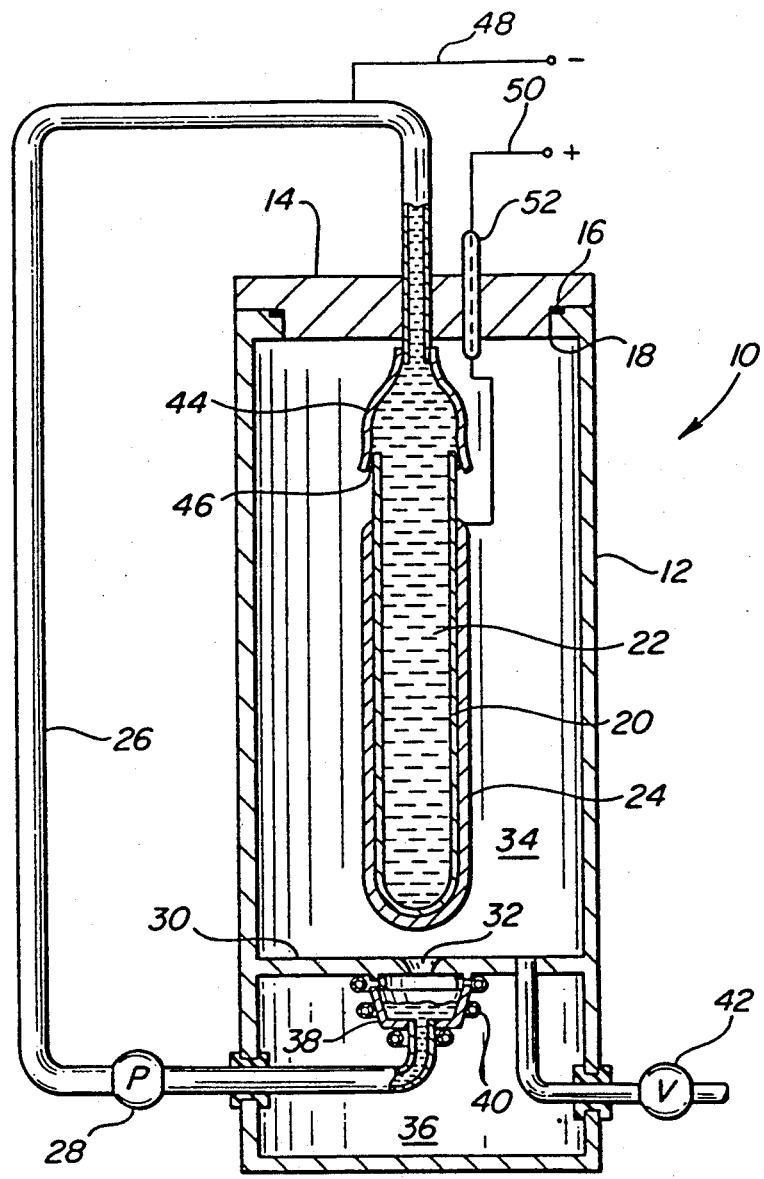
FIG. 1 is a schematic diagram of a typical thermoelectric generator illustrating one use of the braze filler material of the present invention to form a ceramic to metal sealed joint.

Referring now to FIG. 1, an exemplary thermoelectric generator structure is shown schematically and in vertical cross-section with a metal to ceramic sealed joint shown using the improved active metal braze filler material of the present invention. As will be apparent to those skilled in the art, the metal to ceramic sealed joints of the present invention may be adapted for use in thermoelectric generators having differing constructions. Moreover, the improved active metal braze filler and the metal to ceramic sealed joints of the present invention may find use in a number of diverse apparatuses where high temperatures, low pressures, corrosive environments, and/or thermal cycling is involved.

As shown in FIG. 1, the generator 10 is housed in a chemically resistant vessel or chamber 12 fabricated of, for example, stainless steel, ceramic, or the like. A vacuum tight seal of vessel 12 is provided by suitable means such as a cover plate 14 secured by threads or bolts (not shown) and sealed by an O-ring gasket 16 positioned in groove 18. Alternatively, cover plate 14 may be welded or brazed to vessel 12 to provide a durable seal at high operating temperatures.

Positioned inside tube 12 is a smaller tube 20 which comprises the solid ceramic electrolyte. Tube 20 is filled partially or completely with an alkali metal 22 such as sodium and forms a first reaction zone. Portions of the outer surface of electrolyte tube 20 are provided with a thin, electrically conductive electrode 24 which is permeable enough to permit sodium to pass therethrough and sufficiently thick and continuous to conduct electricity. Electrode 24 is shown disproportionately thick in relation to other components of the generator to facilitate its location and identification.

Generator 10 also includes a return line 26 which collects liquid alkali metal which has condensed on the inner walls of vessel 12 and returns it to tube 20. While return line 26 is illustrated as being external to vessel 12, it may also be routed internally through the vessel as taught in U.S. Pat. No. 4,510,210, the disclosure of which is incorporated by reference. An electromagnetic pump 28 is located in return line 26 to pump the recovered liquid alkali metal. Return line 26 is connected to electrolyte tube 20 through metal sleeve 44 which is brazed to ceramic electrolyte tube 20 at braze joint 46 using the active metal braze filler material of the present invention.

Near the lower end of vessel 12 is a pressure zone separator 30 which is also preferably fabricated of stainless steel or other chemical and heat resistant material. Pressure zone separator 30 permits discharge of the condensed alkali metal 22 through orifice 32, but maintains a pressure differential between furnace zone 34 and collection zone 36. After passage through orifice 32, the alkali metal 22 is collected as a liquid in condenser trough 38. Condenser trough 38 is welded, or otherwise secured, to separator 30 and is cooled by heat exchange tubes 40.

As is conventional, generator 10 may be equipped with a vacuum pump 42 to reduce the pressure inside vessel 12. Further, generator 10 may be equipped with a heat source to maintain the temperature in tube 20 at least 100° C. in excess of the lowest temperature in vessel 12. Such a heat source may comprise a heating device (not shown) immersed in the alkali metal 22 in tube 20.

In operation, vessel 12 is evacuated to a pressure lower than about 0.1 torr, preferably lower than about 0.001 torr, and then sealed. Alkali metal such as sodium within tube 20 is heated to a temperature of from about 300° to 1000° C. by suitable means known in the art such as immersion heaters. The portion of vessel 12 near its external walls is maintained at a temperature at least 100° C. below that of the alkali metal in tube 20 by means such as thermal exchange with ambient air or other coolant fluids.

A difference in alkali metal vapor pressure on the opposite sides of electrolyte tube 20 results in the creation of a difference in electrical potential across the electrolyte. As electrons flow through an external circuit, schematically shown by negative terminal 48, positive lead 50, and insulator 52, alkali metal 22 passes through electrolyte tube 20 in the form of cations, giving up electrons through negative terminal 48 in the external circuit. The alkali metal cations then accept electrons from electrode 24 and return to their elemental state.

If the portions of vessel 12 near its outer walls are maintained at their desired temperature of at least 100° C. lower than the alkali metal in tube 20, elemental alkali metal vapor, which has passed through electrode 24, condenses on those walls. The pressure in vessel 12 becomes the vapor pressure of the alkali metal modified by any pressure drop produced by the mass flow of the alkali metal from electrode 24 to the cooler external walls of vessel 12. In continuous operation, the condensed alkali metal is collected in trough 38 and is returned, via return line 26 and electromagnetic pump 28, to tube 20.

Figure 2A:
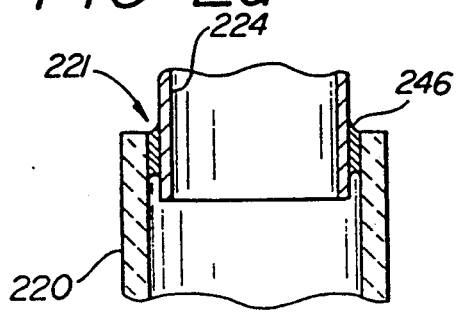
FIGS. 2a and 2b are enlarged cross-sectional views of ceramic to metal sealed joints using the braze filler material of the present invention.
Figure 2B:
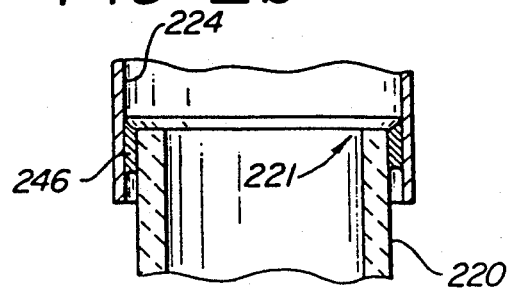

As previously described, one of the major problems in the past with such thermoelectric generators is the maintenance of sealed joints between metal and ceramic parts of the system. FIGS. 2a and 2b illustrate typical ceramic to metal braze joints. As can be seen, braze joint 246 between metal sleeve 224 and ceramic electrolyte tube 220 has been positioned near the end 221 of the electrolyte tube. Joints made in this manner with conventional active metal braze filler materials have frequently failed in the past.

These failures are believed to have been due to thermal stress-induced fractures of the ceramic electrolyte tube at its end or upper corners. The ceramic electrolyte tube is fragile, and the wide range of temperatures to which the braze joint and tube are exposed have led to cracking and failure of the ceramic due to the stresses created by thermal expansion coefficient mismatches among the ceramic, metal part, and braze material forming the joint. The initial heating and cooling to form the joint and/or the repeated thermal cycling under wide temperature ranges stress and/or fatigue the ceramic to a point where it fails.

The present invention provides an improved active metal braze filler material in which the coefficient of thermal expansion of the braze filler material is more closely matched to the coefficients of thermal expansion of the ceramic and metal parts. The braze material of the present invention comprises a first component, preferably in the form of a powder, and an active metal component. Typically, the coefficient of thermal expansion of prior art active metal brazes is much larger than the ceramic part to which they are brazed. The present invention makes use of materials, preferably in powdered form, which have a lower coefficient of thermal expansion than the ceramic part used.

By mixing the powder component with the active metal component of the braze material, there is a reduction in the overall coefficient of expansion of the braze material which causes it to be more closely matched with that of the ceramic. By varying the ratio of the powder component to that of the active metal component of the braze material, the coefficient of thermal expansion of the braze material may be controlled so that it provides a close match with that of the ceramic.

As the ceramic part typically is more fragile and brittle than the metal surface to which it is joined, it is most desirable to be able to match the thermal coefficients of expansion of the ceramic and braze material. We have found that when the powder component selected remains largely undissolved in the active metal component during brazing, its effect on the overall coefficient of expansion of the braze material will be directly proportional to the fractional volume which it occupies in the braze material. However, materials having low coefficients of thermal expansion and which alloy themselves with the active metal component of the braze are also within the scope of this invention.

In accordance with the present invention, a brazing filler material for joining ceramic and metal surfaces is provided which comprises a mixture of a material, preferably in powder form, selected from the group consisting of molybdenum, tungsten, silicon carbide and mixtures thereof, and an active metal filler material selected from the group consisting of alloys or mixtures of nickel and titanium, alloys or mixtures of nickel and zirconium, alloys or mixtures of nickel, titanium, and copper, and alloys or mixtures of nickel, titanium, and zirconium. Additionally, the active metal filler material can be selected from the group consisting of alloys or mixtures of niobium and nickel, alloys or mixtures of niobium and zirconium, alloys or mixtures of niobium and titanium, alloys or mixtures of niobium, titanium, and nickel, alloys or mixtures of niobium, zirconium, and nickel, and alloys or mixtures of niobium, titanium, zirconium, and nickel.

While it is desirable that the powder component of the braze material be in the form of small diameter particles, it is within the scope of the invention to mix the metal particles with an organic binder to form larger particles, sheets, screens, or other three-dimensional shapes which enable the metal to be positioned in place in the joint for brazing.

A preferred method of making the braze material of the present invention includes the steps of forming the powder component into a relatively thin layer using an organic binder. The powder layer may then be interleaved between layers of the active metal braze component. This layered article may then be positioned spanning the ceramic and metal parts, or two ceramic parts, to be joined and the braze filler material heated until it melts, typically at a temperature of between about 900° to about 1200° C.

In order that the invention may be more readily understood, reference is made to the following example, which is intended to illustrate the invention, but is not to be taken as limiting the scope thereof.

EXAMPLE

The improved active metal braze filler material of the present invention was tested to determine its ability to formed sealed joints between metal and ceramic components. The materials to be joined were beta alumina ceramic tubes having wall thicknesses of approximately 0.7 mm and a metal cup of molybdenum. The cup was embossed to have a circumferential bulge contacting the beta alumina solid electrolyte wall. The joints formed were substantially as illustrated in FIGS. 2a and 2b, but with the circumferential bulge in the molybdenum cup. A molybdenum powder was applied to the gap between the metal cup and ceramic wall, and brazing was then accomplished by applying an active metal braze comprising an alloy of titanium, copper, and nickel (TiCuNi) to the joint and heating.

After cooling down to room temperature, the joints formed were cycled from room temperature to about 870° C. at least five times and then tested using the criterion of helium leak testing at $10^{-9}$ std cc/min. All of the joints formed were hermetic under these conditions.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A brazing filler material for joining ceramic and metal surfaces of two ceramic surfaces comprising a mixture of a first material selected from the group consisting of molybdenum, tungsten, silicon carbide and mixtures thereof and which material has a coefficient of thermal expansion less than that of said ceramic, and an active metal filler material selected from the group consisting of alloys or mixtures of nickel and titanium, alloys or mixtures of nickel and zirconium, alloys or mixtures of nickel, titanium, and copper, alloys or mixtures of niobium and nickel, alloys or mixtures of niobium and titanium, alloys or mixtures of niobium, zirconium, and nickel, and alloys or mixtures of niobium, titanium, zirconium, and nickel, which active metal filler material has a coefficient of thermal expansion larger than that of said ceramic, and wherein said first material remains largely undissolved in said brazing filler material whereby the overall coefficient of thermal expansion of said brazing filler material is reduced due to the presence of said first material to cause it to be more closely matched with that of said ceramic.

2. The brazing filler material of claim 1 in which said first material is molybdenum.

3. The brazing filler material of claim 2 in which said first material is in the form of a powder.

4. The brazing filler material of claim 2 in which said active metal filler is an alloy of titanium, copper, and nickel.

5. A brazing filler material for joining an alkali metal beta alumina ceramic and a metal surface comprising a mixture of a first material which remains largely undissolved in said filler and which material has a coefficient of thermal expansion less than that of said alkali metal beta alumina ceramic, and an active metal filler material selected from the group consisting of alloys or mixtures of nickel and titanium, alloys or mixtures of nickel and zirconium, alloys or mixtures of nickel, titanium, and copper, alloys or mixtures of nickel, titanium, and zirconium, alloys or mixtures of niobium and nickel, alloys or mixtures of niobium and zirconium, alloys or mixtures or niobium and titanium, alloys or mixtures of niobium, titanium, and nickel, alloys or mixtures of niobium, zirconium, and nickel, and alloys or mixtures of niobium, titanium, zirconium, and nickel, which active metal filler material has a coefficient of thermal expansion larger than that of said alkali metal beta alumina ceramic whereby the overall coefficient of thermal expansion of said brazing filler material is reduced due to the presence of said first material to cause it to be more closely matched with that of said ceramic.

6. The brazing filler material of claim 5 in which said first material which remains largely undissolved in said filler is molybdenum.

7. The brazing filler material of claim 6 in which said first material is present in the form of a powder.

8. The brazing filler material of claim 6 in which said active metal filler is an alloy of titanium, copper, and nickel.

9. A metal to ceramic joined article comprising a ceramic member, a metal member, and a brazing filler material for joining said ceramic and metal members together, said brazing filler material comprising a mixture of a first material selected from the group consisting of molybdenum, tungsten, silicon carbide and mixtures thereof and which material has a coefficient of thermal expansion less than that of said ceramic, and an active metal filler material selected from the group consisting of alloys or mixtures of nickel and titanium, alloys or mixtures of nickel and zirconium, alloys or mixtures of nickel, titanium, and zirconium, alloys or mixtures of niobium and nickel, alloys or mixtures of niobium and zirconium, alloys or mixtures of niobium and titanium, alloys or mixtures of niobium, titanium, and nickel, alloys or mixtures of niobium, zirconium, and nickel, and alloys or mixtures of niobium, titanium, zirconium, and nickel, which active metal filler material has a coefficient of thermal expansion larger than that of said ceramic, and wherein said first material remains largely undissolved in said brazing filler material whereby the overall coefficient of thermal expansion of said brazing filler material is reduced due to the presence of said first material to cause it to be more closely matched with that of said ceramic.

10. The brazing filler material of claim 9 in which said first material is molybdenum.

11. The brazing filler material of claim 9 in which said first material is in the form of a powder.

12. The brazing filler material of claim 9 in which said active metal filler is an alloy of titanium, copper, and nickel.

13. The brazing filler material of claim 9 in which said ceramic is beta alumina.

14. The brazing filler material of claim 9 in which said metal member is selected from the group consisting of molybdenum, tantalum, niobium, tungsten, vanadium, and alloys thereof.

15. A ceramic to ceramic joined article comprising first and second ceramic members and a brazing filler material for joining said first and second ceramic members together, said brazing filler material comprising a mixture of a first material selected from the group consisting of molybdenum, tungsten, silicon carbide and mixtures thereof and which material has a coefficient of thermal expansion less than that of said ceramic, and an active metal filler material selected from the group consisting of alloys or mixtures of nickel and titanium, alloys or mixtures of nickel and zirconium, alloys or mixtures of nickel, titanium, and zirconium, alloys or mixtures of niobium and nickel, alloys or mixtures of niobium and zirconium, alloys or mixtures of niobium and titanium, alloys or mixtures of niobium, titanium, and nickel, alloys or mixtures of niobium, zirconium, and nickel, and alloys or mixtures of niobium, titanium, zirconium, and nickel, which active metal filler material has a coefficient of thermal expansion larger than that of said ceramic, and wherein said first material remains largely undissolved in said brazing filler material whereby the overall coefficient of thermal expansion of said brazing filler material is reduced due to the presence of said first material to cause it to be more closely matched with that of said ceramic.

16. The brazing filler material of claim 15 in which said first material is molybdenum.

17. The brazing filler material of claim 15 in which said first material is in the form of a powder.

18. The brazing filler material of claim 15 in which said active metal filler is an alloy of titanium, copper, and nickel.

19. The brazing filler material of claim 15 in which at least one of said ceramic members is beta alumina.

* * * * *